(12) United States Patent
Fisher

(10) Patent No.: US 6,900,414 B2
(45) Date of Patent: May 31, 2005

(54) DECK OVEN

(75) Inventor: David Simon Fisher, Creigiau (GB)

(73) Assignee: Aga Foodservice Equipment Limited, Birmingham (GB)

( * ) Notice: Subject to any disclaimer, the term of this patent is extended or adjusted under 35 U.S.C. 154(b) by 7 days.

(21) Appl. No.: 10/399,328

(22) PCT Filed: Nov. 1, 2001

(86) PCT No.: PCT/GB01/04813

§ 371 (c)(1),
(2), (4) Date: Apr. 17, 2003

(87) PCT Pub. No.: WO02/35935

PCT Pub. Date: May 10, 2002

(65) Prior Publication Data

US 2004/0011222 A1 Jan. 22, 2004

(30) Foreign Application Priority Data

Nov. 1, 2000 (GB) .............................................. 0026629

(51) Int. Cl.[7] .............................. A21B 1/24; A21B 1/36; A47J 27/04; A47J 27/16
(52) U.S. Cl. ......................................... 219/401; 126/20
(58) Field of Search ................................ 219/399, 401; 126/20

(56) References Cited

U.S. PATENT DOCUMENTS

| | | | | | |
|---|---|---|---|---|---|
| 3,428,783 A | * | 2/1969 | Niles | ........................... | 219/399 |
| 4,646,630 A | * | 3/1987 | McCoy et al. | ................. | 99/468 |
| 4,697,067 A | * | 9/1987 | Rosset et al. | ................ | 219/401 |
| 4,839,502 A | * | 6/1989 | Swanson et al. | ............. | 219/401 |
| 5,235,903 A | * | 8/1993 | Tippmann | ..................... | 99/331 |
| 5,938,959 A | * | 8/1999 | Wang | .......................... | 219/401 |
| 5,967,020 A | * | 10/1999 | Soyama et al. | ................ | 99/327 |
| 6,107,605 A | * | 8/2000 | Creamer et al. | ............. | 219/401 |
| 6,121,583 A | * | 9/2000 | Hansen | ........................ | 219/401 |
| 6,152,024 A | * | 11/2000 | Tippmann | .................... | 219/401 |
| 6,453,802 B1 | * | 9/2002 | Manganiello et al. | .......... | 126/20 |
| 6,635,854 B1 | * | 10/2003 | Shelton | ....................... | 219/483 |

FOREIGN PATENT DOCUMENTS

| | | |
|---|---|---|
| EP | 0 376 275 | 7/1990 |
| FR | 2 614 976 | 11/1988 |

OTHER PUBLICATIONS

J.R. Irons, "Breadcraft", Virtue and Company Ltd, 1948, p. 112.

* cited by examiner

Primary Examiner—Joseph Pelham
(74) Attorney, Agent, or Firm—Young & Thompson

(57) ABSTRACT

A static deck oven has a flat conducting element (17) located between a cooking shelf (13) and lower heaters (15) The conducting element is connected to and in heat transfer relationship with a water-containing trough (18) inside the oven space Heat passes through the element to the trough and converts the water into steam, which provides a beneficial surface effect to the products being cooked. A computerised controller (22) determines extra energy required to convert a particular dose of water into steam, and controls the energy input to the heaters accordingly.

24 Claims, 3 Drawing Sheets

DECK OVEN

FIELD OF THE INVENTION

The Present invention relates to deck ovens.

BACKGROUND TO THE INVENTION

Some existing deck ovens have a steam generator located outside the oven space which supplies steam into the oven via an inlet pipe. The external steam generator includes a steel or aluminium mass which is heated by heating elements that are dedicated solely to heating the mass. The mass defines a cavity into which a water spray pipe directs a mist or spray of water to produce steam for the deck oven.

SUMMARY OF THE INVENTION

Such a deck oven has the disadvantage that it requires separate heating elements for cooking the products and for producing the steam. Other disadvantages include heat loss and the requirement for control gear for the external steam generator. The external steam generator and the supply pipe require lagging to operate efficiently. Installing the lagging can be a time consuming and expensive operation, and having the steam generator separate from the oven requires extra space and adds to assembly costs. The insulation layer also means that it is difficult and time consuming to maintain or fix internal elements of the steam generator, which is susceptible to lime scale build up.

Other existing ovens have a direct water injection system which sprays water into the oven by means of one or more nozzles located in the oven. It is believed that these types of oven do not significantly reduce the amount of energy used to produce steam even though droplets are heated rather than a large single body of water. This kind of existing oven is also susceptible to limescale build up, especially in the nozzles, and requires pumps and header tanks. Furthermore, the glass, doors and lights within the oven may be susceptible to damage caused by direct impact of water droplets and the baked product may suffer if impacted by unvapourised water droplets. Although it does not require external steam elements and therefore there is no external heat loss, this steam generator does not tend to produce satisfactory "shine" on certain food products such as loaves.

Embodiments of the present invention are intended to provide a more efficient and smaller deck oven without loss of steam quality. Space is often at a premium in the design of ovens, especially for example where the oven is to be fitted in an existing cooking area, e.g. in a supermarket. Preferred embodiments of the present invention produce steam without the need for specialised heating elements.

According to a first aspect of the present invention there is provided a deck oven including:

at least one heater;

a steam generator including a conducting element located in a lower part of the oven, the element being in heat transfer relationship with the heater, and a water container in heat transfer relationship with the conducting element, such that in use, the water in the container is heated to produce steam.

The container may be internal or outside the oven. The container may be a trough. The container can be placed at an end of the oven remote from the oven door. Water may be supplied to the container by means of a pipe. A shield may be located between the container and the main cooking area, possibly abutting the container, to help prevent splashing and distribute the steam evenly in the oven.

The conducting element may either be integral with or connected to the water container. The conducting element and/or the container may be formed of a plurality of aluminium plates.

The oven typically further includes a heat distribution shelf abutting or adjacent the heater. The steam generator can be located between the shelf and the heater. The heat distribution shelf can be formed of at least one ceramic or metallic tile. In an alternative embodiment, the conducting element and heat distribution shelf can be a single body formed of suitable material. In yet another embodiment the water container and heat distribution shelf may be a single integral body. In this case, water may be supplied from under the shelf.

The conducting element may be substantially planar and may have dimensions substantially similar to those of the main cooking area. The element may be rectangular and may have dimensions similar to those of the shelf. The conducting element can be formed of aluminium or other good heat transfer material.

The heater may include a plurality of heating elements. The heating elements may be spaced apart at intervals along the conducting element. The intervals between the elements may be smaller near the container than the spaces between the elements further from the container. The heating elements may be intended for combined use for baking and heating the water container, or may be dedicated to one or the other.

The oven may further include a controller, which may be configured to keep either all the heating elements or only the heating element(s) nearest to the water container on for substantially longer than required for baking. The controller may control the power to the heating elements so that the heat input rate is at a higher level for a specified time period. The specified time period or power level may be a function of the amount of steam and/or water to be supplied into the oven. There may be at least one additional heating element located near the container.

The controller may include a program selection component for selecting the temperature and duration of baking and, optionally, steaming. The controller may be configured to implement a warm-up procedure in which the oven space reaches a desired temperature before cooking begins. A thermocouple component may be used to monitor the oven temperature and output from this can be used by the controller to control the heater during the warm-up. The controller can determine the number of heating elements that are switched on during the warm-up. Alternatively or additionally, the controller may control the period of time for which all or some of the elements are switched on/off during the warm-up. For example, the controller may switch all the elements on for 50% of the warm-up period and then switch them off for 50% of the period.

The controller may require a user to input a Start command before commencing the baking and, optionally, the steaming, after the warm-up.

If steam is to be used then the controller may calculate the amount of energy required to produce the desired level of steam in addition to the energy required for the heater to bake. A thermocouple component may be used to monitor the oven temperature and output from this can be used by the controller to control the heater during the baking and, optionally, steaming. The controller may be implemented by software. A thermocouple component may be used to perform at least some of the functions of the controller.

The deck oven may include a plurality of shelves, each shelf having a corresponding respective conducting element and container. The oven may be a static oven.

According to another aspect of the present invention there is provided a deck oven including:

a shelf for receiving products to be cooked;

at least one heater located beneath the shelf;

a steam generator including a conducting element located in the oven between the heater and the shelf, the element being in heat transfer relationship with the heater, and a water container in heat transfer relationship with the conducting element, such that in use, the water in the container is heated to produce steam.

According to another aspect of the invention there is provided a method of producing steam in a deck oven, the method including steps of:

supplying water to a container in the oven, the container being in heat transfer relationship with a conducting element located in a lower part of the oven, the conducting element being in heat transfer relationship with at least one heater, and heating the conducting element such that the water in the container is heated to produce steam.

Whilst the invention has been described above, it extends to any inventive combination of the features set out above or in the following description.

BRIEF DESCRIPTION OF THE DRAWINGS

The invention may be performed in various ways and, by way of example only, an embodiment thereof will now be described, reference been made to accompanying drawings in which.

DETAILED DESCRIPTION OF THE INVENTION

Figure 1:
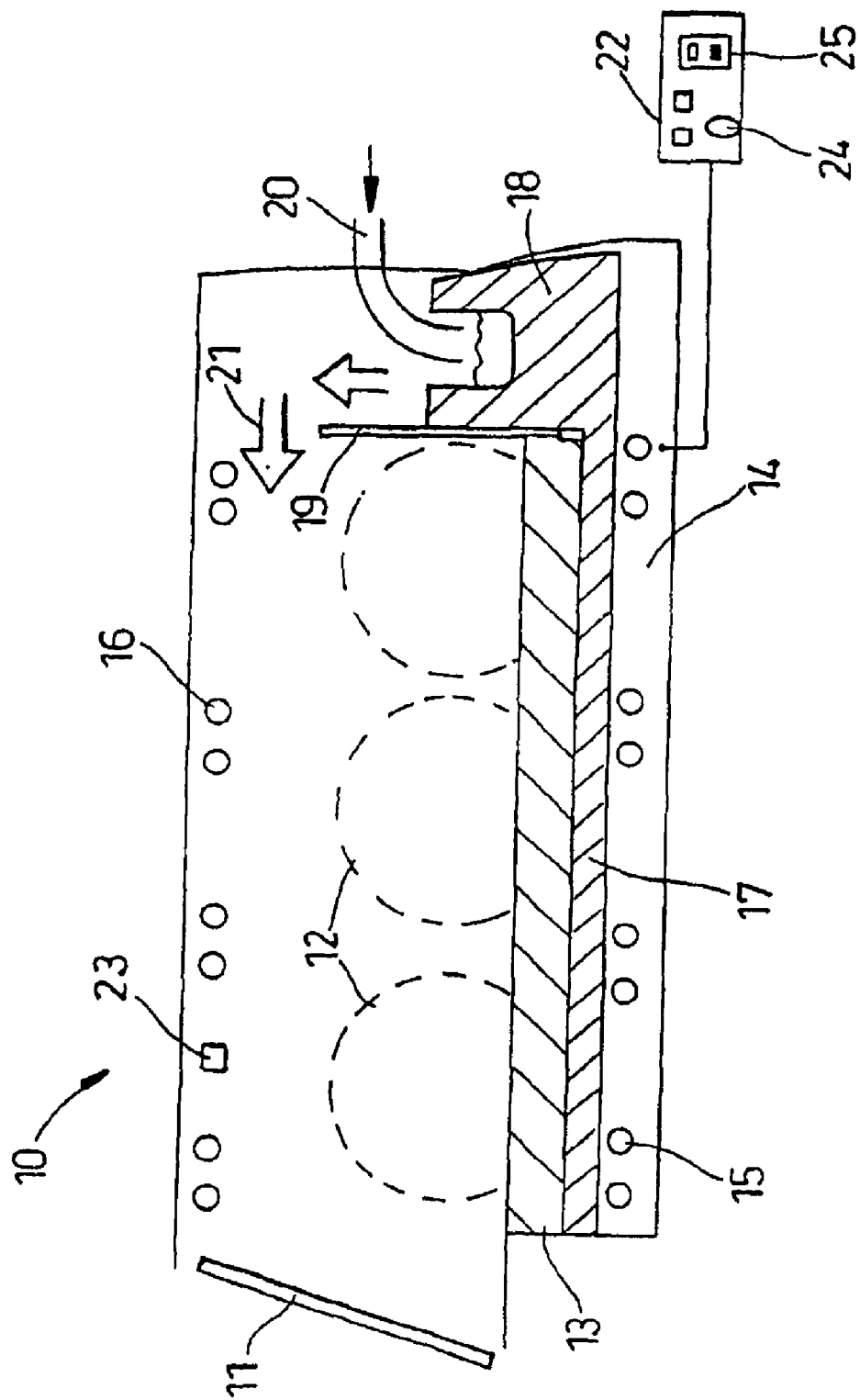
FIG. 1 is a section side view of a deck oven according to a preferred embodiment.

Referring to FIG. 1, a deck oven generally indicated at 10 includes a swing door 11 at one end, which is opened to transfer products 12 such as loaves into and out of the oven space. The products are placed on an oven shelf 13 formed of a ceramic tile. Beneath the ceramic tile 13 there is a cavity 14 in which there is a plurality of lower heating elements 15, which can operate by gas or electricity. Although four pairs of elements 15 are shown in FIG. 1, it will be appreciated that any reasonable number or arrangement of heaters may be provided. In particular, the spaces between the heaters may be smaller at the end of the oven remote from the door 11 so as to be beneficial for the production of steam as will be described below. As with conventional ovens, the heating elements 15 can be used to supply heat to bake the products 12. The ceramic tile 13 is intended to distribute the heat produced by the lower heating elements 15. There is also a plurality of upper heating elements 16 located near the ceiling of the oven space.

Also located in cavity 14 is a substantially flat rectangular aluminium heat collector 17. The heat collector 17 is located above the lower heating elements 15 (i.e. between the heating elements 15 and the lower surface of the tile 13). It will understood that the heat collector 17 could be placed beneath the heating elements 15, although it is believed that the heat transfer will not tend to be as effective. The collector 17 has substantially the same width as the ceramic tile 13 but has a longer length so that it extends from the door end of the oven to the remote end of the oven beyond the edge of the ceramic tile 13, thereby covering substantially the same area as the oven floor. As the heat collector covers a large proportion of the area under the tile 13, local hot spots are reduced or eliminated.

A container 18 is formed integrally with the remote end of the collector 17 inside the end of the oven remote from the door. Having the container in this location is preferred for smaller ovens; however, it will be appreciated that the container could be located near the door or along the side of the oven space. It may also be desirable to have more than one water container. In an alternative embodiment the container 18 is located outside the oven body, although this is likely to result in more heat loss and insulation may be required for it.

Figure 2:
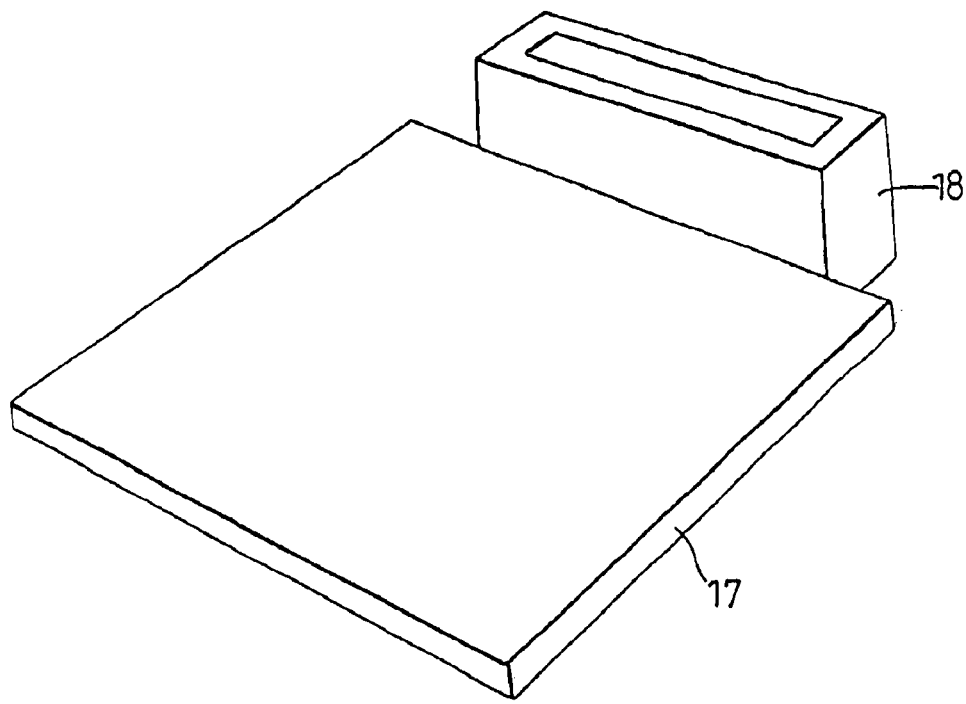
FIG. 2 illustrates a detailed view of a conductive element and trough for use in the oven of the preferred embodiment.

The container 18 is a trough formed from a substantially rectangular block narrower in width than the tile 13 with a cavity extending substantially across its width (see FIG. 2). The container 18 has a depth of approximately 50 mm. A rectangular shield 19 is fixed vertically inside the oven, adjacent the container 18 and between it and the door 11 to reduce the possibility of the oven contents being exposed to fluid droplets or spitting. The shield 18 can also assist with balancing the distribution of steam within the oven space.

A water pipe 20 enters through the wall of the oven remote from the door 11 to deliver water into the trough 18. The pipe 20 has a diameter of typically around 8–22 mm, to help avoid build up of scale inside it. In addition, the pipe 20 is inclined to ensure that little or no water remains in it after steaming.

In use, the aluminium collector 17 absorbs part of the heat generated by the lower heating elements 15. The heat is conducted along the collector 17 to the trough 18, thereby converting the water in the trough into steam. The steam rises and moves into the oven space as indicated by arrows 21.

The heating elements 15 are switched on/off by a computerised controller 22, possibly in response to a temperature sensor/thermocouple 23 located near the ceiling of the oven by the door 11.

In one embodiment, the controller functions as follows:

1. If the programme selected uses steam, the bottom elements stay full on for a fixed time after the baking is started, ignoring the bottom heat setting. It is intended that the time is fixed for all products, initially around 8 minutes, adjustable in increments of approximately less than 0.5 minutes. The time could be a programmable variable or be linked with the bake/steam time for certain products.

2. When a Stop button on the controller is pressed after a program that uses steam, the bottom elements can be controlled to stay on full power for a fixed time between 0 and 5 minutes, e.g. 2 minutes.

3. To attempt to ensure that the steam system is warmed up before the first bake, upon power up the bottom elements can be running at between sixty and one hundred percent of their full power. They can stay on until a fixed temperature below the selected baking temperature is reached, for example 25° C. below.

Figure 3:
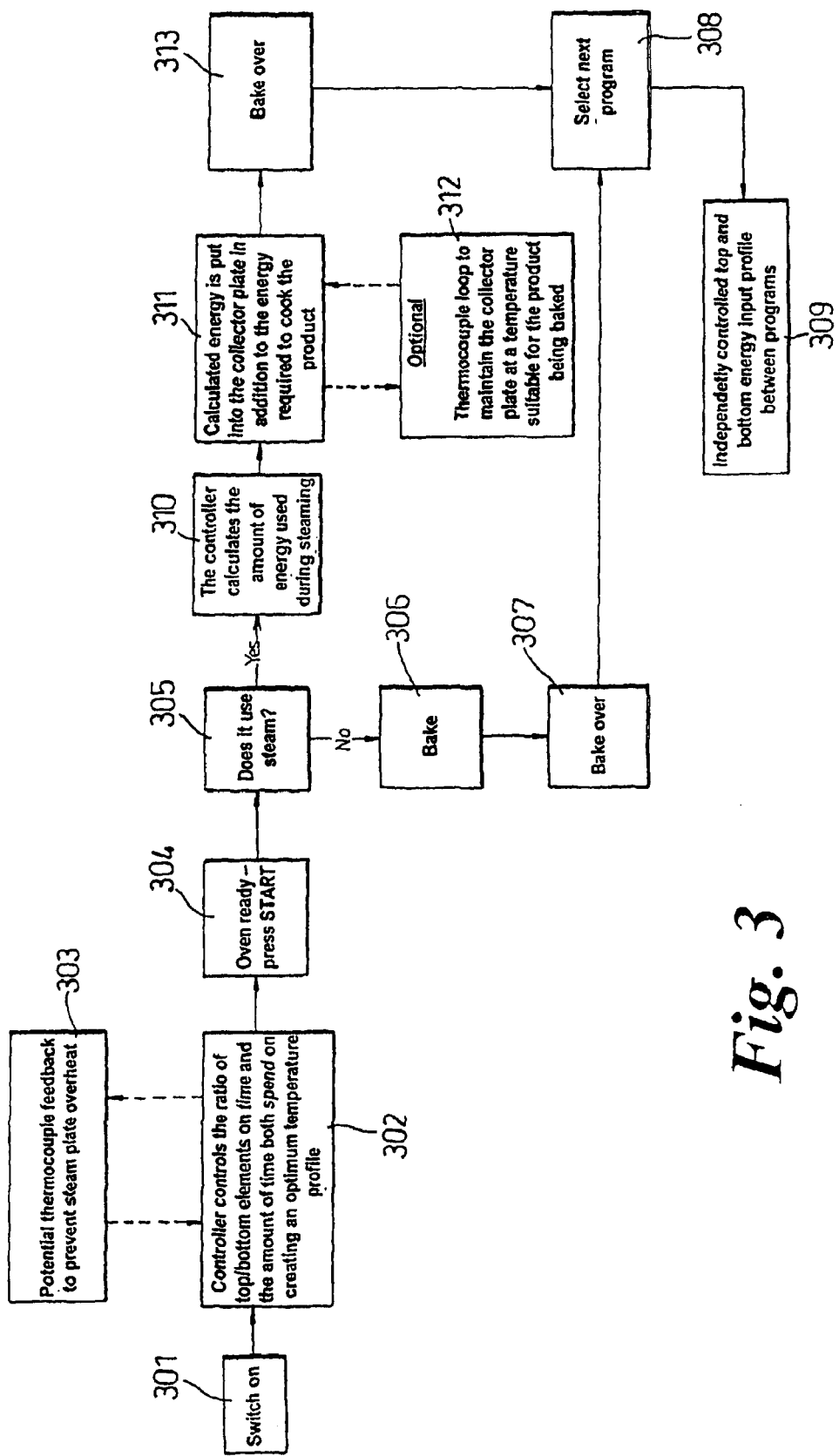
FIG. 3 illustrates schematically the steps which can be performed in connection with a computerised controller of the oven.

FIG. 3 illustrates the steps performed in connection with the computerised controller 22 in one embodiment of the oven. At step 301 the oven is switched on and one or more cooking programs can be selected by a user by means of an interface 25 on the controller 22. The programs typically specify the temperature and duration of the baking and, optionally, steaming.

At step 302 the controller controls the periods for which the top and/or bottom heating elements are switched on/off and so the amount of time sets of elements spend creating an optimum temperature in accordance with the selected bake/steam programme. This "pre-cooking" step allows the oven to warm up quickly to the optimum temperature, ideally always in substantially the same period of time, thereby saving energy over long warm-up times. Feedback from the thermocouple 23 may be used by the controller to prevent overheating (step 303).

When the oven has reached the desired temperature, the oven is ready and the operator may press a Start button (indicated at 24 in FIG. 1) at step 304 to begin cooking.

At step 305 the controller computer checks whether the selected programme uses steam. If this is not the case then at step 306 the oven bakes using the heating elements without steam for the required length of time and baking stops at step 307.

When the cooking is over, at step 308 the controller analyses the next programme that has been selected by the user. The controller then creates a profile for the on/off periods of the independently controlled top and bottom heating elements at step 309 so that the temperature needed for the next programme can be achieved in the oven. Doing this between programmes means that when steam is not needed the waiting time between bakes is reduced. Furthermore, the collector plate can be set at an optimum temperature.

If the controller check of step 305 indicates that steam is to be used then at step 310 the controller calculates the amount of energy used during the required steaming. This can involve determining the extra amount of energy required to convert a particular dose of water (data regarding the flow rate of water into the oven can be obtained by the controller computer) into steam and controlling all or some of the heaters to adjust the temperature accordingly. This can be achieved by the controller 22 by calculating the period of time for which the bottom heating elements need to remain on to achieve the temperature and adjusting the state of the heaters accordingly.

The controller can calculate how far the current oven temperature is from the desired temperature and adjusts the on/off time of the bottom heating elements (and/or the top elements in an alternative embodiment) until the target temperature is substantially achieved. As the oven temperature gets nearer the target temperature, the "off" time of the heating elements will typically get longer so that the temperature is reached without overheating. The software used by the controller can take into account how the presence of the extra mass (e.g. the container and water) within the oven may affect the temperature change.

If the steaming is stopped part way through the programme then the controller may note the elapsed time into the program and can then calculate the time for which the bottom heating elements are required to stay on to complete the programme as if it had not been stopped.

At step 311 the calculated energy is put into the collector plate in addition to the energy required to bake the product. Approximately 2 minutes may be is added to the heating time to even up the temperature. The thermocouple loop may be used to maintain the collector plate at a temperature suitable for the product being baked (step 312). When the cooking has finished (step 313) control is passed on to step 308 as described above.

Figure 4:
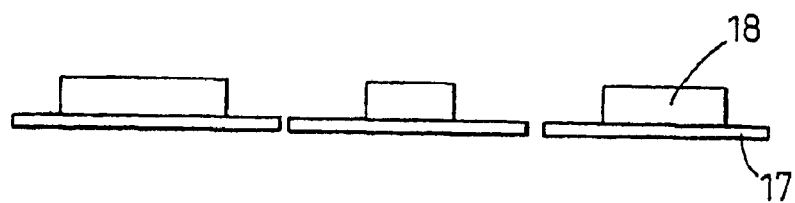
FIG. 4 illustrates a front view of part of an oven including a plurality of conductive elements and troughs.

As can be seen in FIG. 4, if an oven contains a plurality (e.g. three) trays/shelves side by side, then each shelf can have its own heat collector and trough, each working in the way described above. It will be appreciated that arrangements of multiple shelves other than side by side can also work in substantially the same way.

The embodiments described above have several advantages over conventional deck ovens. The ones lacking an external steam producer means that the ovens take up less space, thereby reducing the number of parts and lagging operations required on conventional ovens and thereby reducing assembly costs. Having an integral steam generator means that heat loss from an external steam generating unit is eliminated. The aluminium collector 17 can be easily removed for cleaning and so is more resilient to lime scale build up. As the water is supplied into the heated trough 18, a greater volume of water comes directly into contact with a heated surface than by conventional spray/mist pipes and so vaporisation of the water is assured.

The embodiments described above do not need a dedicated heater to create steam, as the heat can be taken from the heating elements that can also bake. Also, if steaming is not required, there is little or no heat loss attributable to the steam generator. Other advantages of the embodiments include reduced manufacturing costs as the amount of insulation, support brackets, elements, control system, wiring and sheeting associated with an external steam generator is reduced. Improved maintenance and reliability is also an advantage as the embodiments tend to be more resistant to limescale, especially as there are no nozzles present, and even if limescale does build up then it is more easy to maintain than earlier arrangements. However, tests have shown that little lime scale builds up on the collector 17 as the conversion of the water into steam involves quite "violent" boiling and so the water is scattered and can be blown out of the oven. Furthermore, no pumps, thermocouples, contactors, air compressors, water tanks, float valves, etc are essential. The internal steam generator also means that the oven has a smaller foot print, thereby saving space, and the oven depth can also be reduced.

The oven can also have a reduced power (kW) rating as the same heating elements are used for producing steam as for baking. As well as this reduced energy consumption, the amount of water needed by the oven to steam is also less than for conventional ovens.

Having separate tiles and heat collectors has the advantage of being easy to remove and clean. They can also be modular for the production of ovens having different widths. They provide even steam distribution and even heat collection. It is also possible that the collector and shelf could be combined into a single shelf formed of suitable material.

Our results show that this method of producing steam provides a more reliable and better shine on products such as bread than conventional direct water spray systems, comparable to that produced by a conventional deck oven with an external steam generator, only without the disadvantages associated with the external steam generator. It is thought that having the water flow relatively slowly onto the small surface area of the container allows some of the water to keep boiling after part of it has been converted to steam, which helps improve the "shine".

What is claimed is:

1. A deck oven including:
   a shelf (13) for receiving products to be cooked;
   at least one heater (15) located beneath the shelf;
   a steam generator including a conducting element (17) located in a lower part of the oven between the heater and the shelf, the element being in heat transfer relationship with the heater, and
   a water container (18) in heat transfer relationship with the conducting element, such that in use, the water in the container is heated to produce steam.

2. A deck oven according to claim 1, wherein the container (18) is inside the oven.

3. A deck oven according to claim 1, wherein the container (18) is a trough.

4. A deck oven according to claim 1, wherein the container (18) is placed at an end of the oven remote from an oven door (11).

5. A deck oven according to claim 1, further including a shield (19) located between the container (18) and the main cooking area.

6. A deck oven according to claim 1, where the conducting element (17) is integral with the water container (18).

7. A deck oven according to claim 1, where the conducting element (17) is a separate element connected to the water container (18).

8. A deck oven according to claim 1, further including a heat distribution shelf (13) abutting or adjacent the heater (15).

9. A deck oven according to claim 8, wherein the steam generator is located between the shelf (13) and the heater (15).

10. A deck oven according to claim 8, wherein the conducting element (17) and the heat distribution shelf (13) are a single body formed of a suitable material.

11. A deck oven according to claim 8, wherein the water container (18) and heat distribution shelf (13) are a single integral body.

12. A deck oven according to claim 8, wherein the conducting element (17) is substantially planar and has dimensions substantially similar to those of the main cooking area.

13. A deck oven according to claim 1, wherein the heater includes a plurality of heating elements (15) spaced apart at intervals along the conducting element (17).

14. A deck oven according to claim 13, wherein the heating elements (15) are adapted for combined use for baking and heating the water container (18).

15. A deck oven according to claim 1, wherein the heater includes a plurality of heating elements (15) spaced apart at intervals along the conducting element (17), the oven further including a computerised controller (22) for controlling the heater (15), the controller (22) being operable to switch the heating elements (15) on and off for specific periods of time, the on/off periods being adjusted in accordance with information regarding the temperature of the oven provided by a thermocouple component (23).

16. A deck, oven according to claim 15, wherein the specified time period or power level is a function of a required amount of steam and/or water quantity.

17. A deck oven according to claim 15, wherein the intervals between the elements (15) are smaller near the container (18) than the intervals between the elements further from the container.

18. A deck oven according to claim 15, wherein the controller (22) can communicate with a thermocouple component (23) for detecting the temperature of the oven, the information provided by the thermocouple being used by the controller (22) to control the heater (15) to achieve a specific temperature in the oven.

19. A deck oven according to claim 15, wherein the controller (22) is operable to implement a warm-up procedure in which the oven space reaches a desired temperature before cooking begins.

20. A deck oven according to claim 19, including a thermocouple component (23) for monitoring the oven temperature during the warm-up, the controller (22) using information provided by the thermocouple to control the heater (15) to achieve the warm-up temperature.

21. A deck oven according to claim 15, wherein the controller (22) calculates the amount of energy required to produce the desired level of steam in addition to the energy required for the heater to bake.

22. A deck oven according to claim 1, wherein the deck oven includes a plurality of shelves (13), each said shelf having a corresponding respective steam generator conducting element (17) and container (18).

23. A method of producing steam in a deck oven, the method including steps of:
   activating a deck oven having a shelf (13) for receiving products to be cooked, at least one heater (15) located beneath the shelf, a steam generator including a conducting element (17) located in the oven between the heater and the shelf, the element being in heat transfer relationship with the heater, and a water container (18) in heat transfer relationship with the conducting element, such that in use, the water in the container is heated to produce steam;
   supplying water to the container (18) in the oven; and
   heating the conducting element such that the water in the container is heated to produce steam.

24. A deck oven, comprising:
   at least one heater (15);
   a steam generator including a conducting element (17) in a lower part of the oven, the conducting element being in heat transfer relationship with the heater;
   a water container (18) in heat transfer relationship with the conducting element, such that in use, the water in the container is heated by the conducting element to produce steam; and
   a heat distribution shelf abutting or adjacent the conducting element (17).

* * * * *